United States Patent
Zhai et al.

(10) Patent No.: US 11,496,769 B2
(45) Date of Patent: Nov. 8, 2022

(54) NEURAL NETWORK BASED IMAGE SET COMPRESSION

(71) Applicant: Apple Inc., Cupertino, CA (US)

(72) Inventors: Shuangfei Zhai, Cupertino, CA (US); Joshua M. Susskind, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 305 days.

(21) Appl. No.: 16/835,724

(22) Filed: Mar. 31, 2020

(65) Prior Publication Data

US 2021/0099731 A1 Apr. 1, 2021

Related U.S. Application Data

(60) Provisional application No. 62/907,430, filed on Sep. 27, 2019.

(51) Int. Cl.
*H04N 19/00* (2014.01)
*H04N 19/625* (2014.01)
*G06N 20/00* (2019.01)

(52) U.S. Cl.
CPC ........... *H04N 19/625* (2014.11); *G06N 20/00* (2019.01)

(58) Field of Classification Search
CPC ............................ G06N 20/00; H04N 19/625
See application file for complete search history.

(56) References Cited

U.S. PATENT DOCUMENTS

| | | | |
|---|---|---|---|
| 10,652,581 B1 * | 5/2020 | Bokov | H04N 19/70 |
| 10,817,990 B1 * | 10/2020 | Yang | G06N 3/0445 |
| 2003/0059121 A1 | 3/2003 | Savakis et al. | |
| 2004/0249774 A1 | 12/2004 | Caid et al. | |
| 2020/0145662 A1 * | 5/2020 | Park | G06V 10/82 |
| 2020/0311914 A1 * | 10/2020 | Zaharchuk | G06T 7/0012 |
| 2021/0021823 A1 * | 1/2021 | Na | G06N 3/084 |

* cited by examiner

*Primary Examiner* — Li Liu
(74) *Attorney, Agent, or Firm* — BakerHostetler

(57) ABSTRACT

Techniques for coding sets of images with neural networks include transforming a first image of a set of images into coefficients with an encoder neural network, encoding a group of the coefficients as an integer patch index into coding table of table entries each having vectors of coefficients, and storing a collection of patch indices as a first coded image. The encoder neural network may be configured with encoder weights determined by jointly with corresponding decoder weights of a decoder neural network on the set of images.

20 Claims, 3 Drawing Sheets

100

200

300

400

500

NEURAL NETWORK BASED IMAGE SET COMPRESSION

CROSS REFERENCE TO RELATED APPLICATIONS

This application claims the benefit of priority under 35 USC 119(e) of U.S. provisional application No. 62/907,430, filed on Sep. 27, 2019.

BACKGROUND

This disclosure relates to image compression technologies.

Traditional lossy image compression techniques often include a domain transform, quantization, and entropy coding. A frequency domain transform, such as a discrete cosine transform (DCT), transforms digital source image data from a spatial domain to a frequency domain, with an effect of compacting signal energy into a small number of frequency coefficients. Quantization explicitly throws information away, generally attempting to lose only less important information. Entropy coding generally will losslessly reduce the size of input data. The general goal for lossy image compress is to retain as much image visual quality as possible while reducing size of an encoded image. Motion video coding techniques may include all the above techniques, with the addition of a motion prediction technique.

Neural networks have been applied to a myriad of applications within various fields, including medicine, finance, engineering, and physics. Generally, neural networks are trained to predict information of interest based on observations. Training may be accomplished through a supervised learning process, wherein correlations between example pairs of input data (the observations) and output data (the information of interest) are learned. Increasing computational capacity and other recent developments in machine learning have enabled application of neural networks to the realm of image and video compression.

Generally, a neural network is comprised of a system of nodes ("neurons") that are spatially connected in a given architecture, typically layers—the nodes in one layer feed the nodes in the next layer connected to it. Training the neural network results in "knowledge" that is represented by the strength of inter-nodes connections ("synaptic weights"). A neural network's input data are fed into each node of the network's first layer as a weighted combination. Next, each node's inputted weighted combination is translated according to an activation function, resulting in the node's output data. The output data from the first layer are then propagated and similarly processed in the other intermediate layers of the network, where the last layer provides the output data. Hence, a neural network is characterized by the structure of its nodes and these nodes' activation functions. The weights associated with each node's inputs (i.e., each node's connection strengths) are learned by an iterative training process, e.g., a backpropagation algorithm, according to training parameters (learning rate and cost function) and based on examples of corresponding input and output data.

DETAILED DESCRIPTION

Techniques for coding sets of images with neural networks are described herein. Encoding techniques include transforming a first image of a set of images into first coefficients with an encoder neural network, encoding a group of the first coefficients as an integer patch index into set coding table associated with the set of images and where each entries in the set coding table includes a vector of coefficient approximations for the set of images, and storing a collection of patch indices as a first coded image. The encoder neural network may be configured with encoder weights determined by jointly training with decoder weights of a corresponding decoder neural network using a as a training dataset that includes a plurality of sets of images. In some aspects, a second image may be transformed with the encoder neural network into second coefficients, a group of the second coefficients may be encoded as a second integer patch index into the coding table, and a collection of second patch indices may be stored as a second coded image. The first coded image, the second coded image, and a global code including weights for decoder neural network may be stored as a coded set of images.

Figure 1:
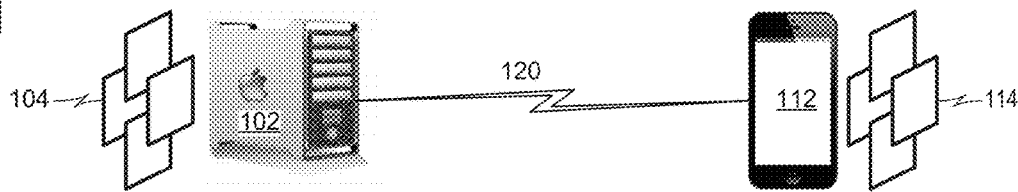
FIG. 1 depicts an example encoder decoder system.

FIG. 1 depicts an example encoder and decoder system 100. An encoder 102 may encode a set of images 104, transmit the encoded images via network 120 to decoder 112. The decoder 112 may then decode the encoded images received from network 120 into decoded images 114. In an aspect, encoder 102 may determine a set coding table the set of images and transmit the set coding table to the decoder 112. In another aspect, only a subset of the encoded images transmitted to the decoder system 112.

Figure 2:
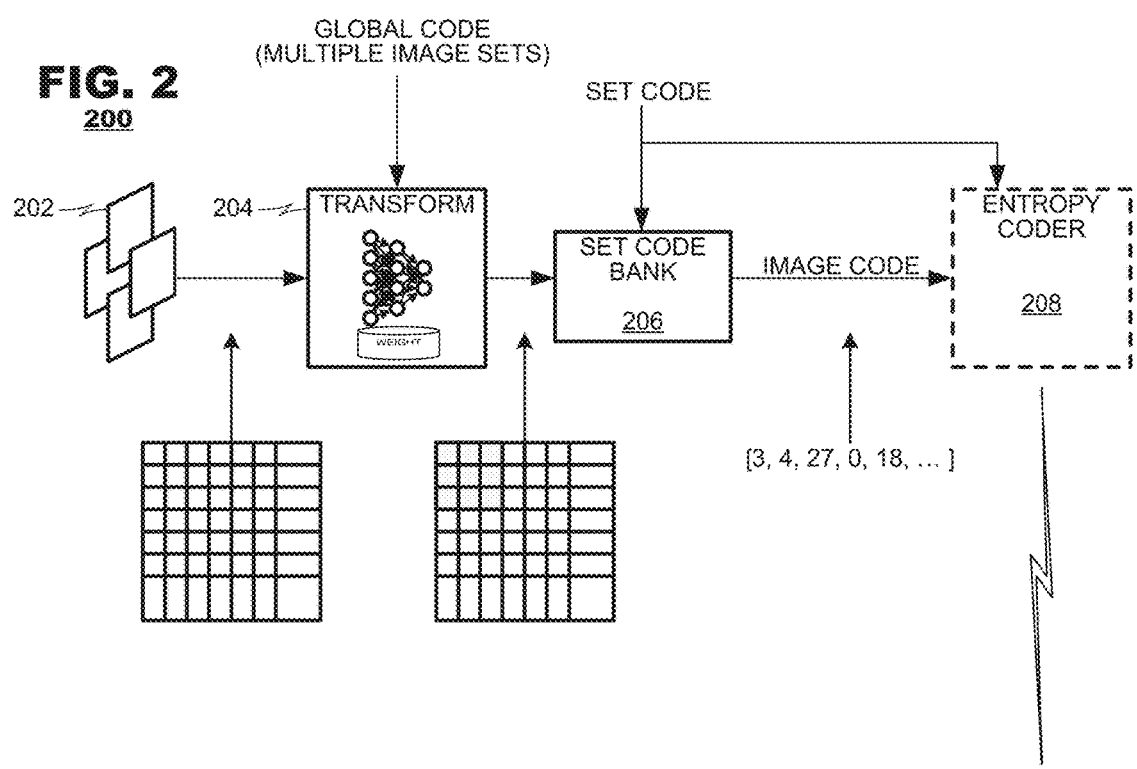
FIG. 2 depicts an example encoder system.

FIG. 2 depicts an example encoder system 200. Encoder 102 of FIG. 1 may include encoding system 200. Encoder system 200 includes an encoding neural network 204, a set code bank 206 coding table, and an optional entropy coder 208. Encoding neural network 204 may transform source image data, such as from an image set 202, into coefficients. Source image data input to the encoding neural network may be pixel data arranged spatially in a two-dimensional array. Coefficient data output from the Neural Network may also be arranged spatially in a two-dimensional array. Code set bank 206 may include an set encoding table where each entry is a set of coefficients for the image set 202. Code set bank 206 may encode groups of coefficients as a single index in the encoding table. Transform coefficients output from the encoder neural network 204 may be arranged into spatially contiguous patches of coefficients, and each patch may then be encoded individually by the code set bank 206. A group of indices output by set code bank 206 may collectively constitute the code for an individual encoded image. The encoded image may be stored for later decoding, and in some aspects, may be transmitted to a remote decoder.

In an aspect, the code set bank may be a vector quantizer for quantizing groups of floating point coefficients into an index into a vector quantization coding table for the image set. For an input group of coefficients, the code set bank may output the index corresponding to the table entry most similar to the input group, or the table entry that will cause the least coding error. Coding error may be based, for example, on a minimum total error, mean square error, or other error metric of approximating each input coefficient with the values in the table entry. In some aspects, coefficients input to the set code bank may be floating point or real numbers, while the indices output may be integers. An index of an entry may be selected by the set code bank for an input set of coefficient based on In an aspect, the a set coding table for the code set bank predetermined by analyzing the entire image set before compressing any particular image in the image set, or the set coding table may be constructed or modified dynamically while the image set is compressed. For example, a differentiable clustering procedure may be used to modify entries in the encoding table. Such a differentiable clustering technique may not require storing sharing the resulting encoding table globally. Instead a decoder may be able to follow the same clustering procedure and modify the code set bank's encoding table at the decoder based only on the selected indices in the individual code for an image. In one example, a k-means method may be used to do the clustering, which may cluster patches of encoded features from across the set of images into a set of representative prototypes, where each representative prototype is stored as one entry in the encoding table.

Encoder neural network 204 may be configured with encoder weights, and the encoder weights may have corresponding decoder weights for a decoder neural network. The encoder weight and decoder weights may be jointly trained on a dataset including a group of images. A global code that includes the set of decoder weights may be predetermined and fixed for a decoder, or in some aspects, such as global code may be stored and sent to a decoder separately from an individual encoded image or encoded set of images.

In an aspect, the neural networks may be trained with a dataset of images all belonging to the same class of images, and then the jointly trained encoder and decoder weights may be later used to encode and decode images that were not in the training dataset but may belong to the same class. Images may be classified into classes in many ways. Classes might relate to the content of images, such as pictures containing the same type of object (pictures of cats, trees, etc.) or all pictures of the same scene. A class might relate to a digital imaging parameter such as resolution, aspect ratio, bits per pixel, dynamic range, size of color gamut. Classes might also be related to the source of digital image, for example whether an image was captured with a camera or synthetically generated, and if captured with a camera, an image might be classified based on camera parameters such as aperture, exposure time, zoom, flash setting, which camera was used to capture, or geolocation of capture. Images may be classified automatically, for example based on image capture metadata for each image, or by image classifying neural network trained to classify image content. Images may also be classified manually, where a human organizes images into classes.

An optional entropy coder 208 may entropy code groups of indices output from the code set bank 206 to losslessly compress an encoded image (or portion thereof), for example based on variation in the probability distribution of input values. In an aspect, entropy coder 208 may include a Huffman coder or arithmetic coder. In another aspect, entropy coder 208 may include a neural network configured with entropy coding weights. A neural network included in the entropy coder may predict probabilities input to the entropy coder. Inputs to an entropy coder (and a entropy coding neural network) may include both groups of indices output from the set code bank 206, and the set code which includes the set coding table used by the set code bank. Entropy coding weight may be jointly trained along with the encoder and decoder weights. Hence, the weights for encoder, decoder, and entropy coder neural networks may all need to correspond to each other in that they have been trained with each other.

In an aspect, an encoder controller (not depicted) may control or perform the encoding process including the transform encoder neural network 204, set code bank 206, and optional entropy coder 208. A decoder controller (not depicted) may control or perform the decoding process including the transform decoder neural network 306, set code bank 304, and optional entropy decoder 302. Encoder and decoder controllers may include a computer processor and execute instructions stored in a memory or other non-transitory storage medium.

Figure 3:
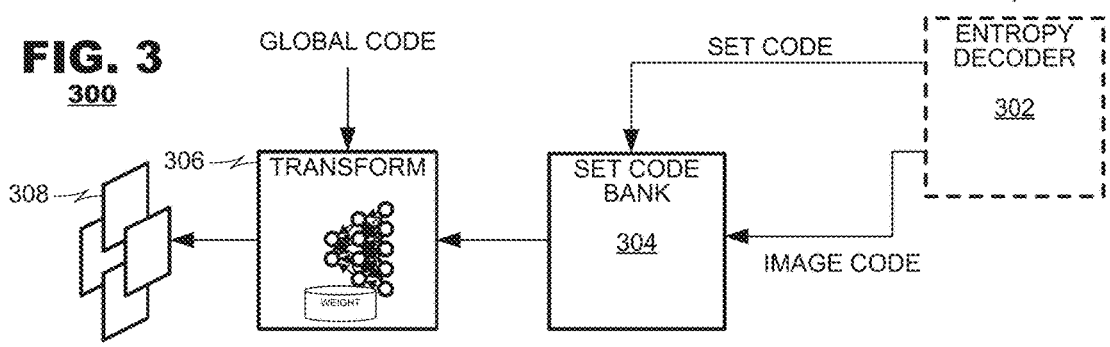
FIG. 3 depicts an example decoder system.

FIG. 3 depicts an example decoder system 300. Decoder 112 of FIG. 1 may include decoding system 300. Decoding system 300 includes an optional entropy decoder 302, a code set bank 304 coding table, and a decoding neural network 306. An encoded image, in the form of a group of integer indices, may be input to set code bank 304. The code set bank may translate each index into a set of transform coefficients that constitute a patch coefficients. Each patch of coefficients may be a spatially connected patch of neighboring coefficients. Code set bank 304 may include a set code table associated with the set of images and every entry in the table being a set of coefficients. The output of set code bank 304, in response to an input index value, may be the patch of coefficients contained in the code table entry corresponding to the input index. One or more patches of transform coefficients may then be into to decoder neural network, which may transform a collection of coefficient patches into pixel data as an output decoded image. In an aspect, the set code bank may be configured with a set code table received from an encoder source.

Decoder neural network 306 may be configured with decoder weights, and the decoder weights may correspond to encoder weights used to encode an image. A global code including the set of decoder weights may be predetermined for all images and sets of images. Alternately, different global codes may be used for different sets of images. A global code including decoder weights may be received from an encoder separately, and global code may be separately from any individual encoded image or sets of encoded images.

Figure 4:
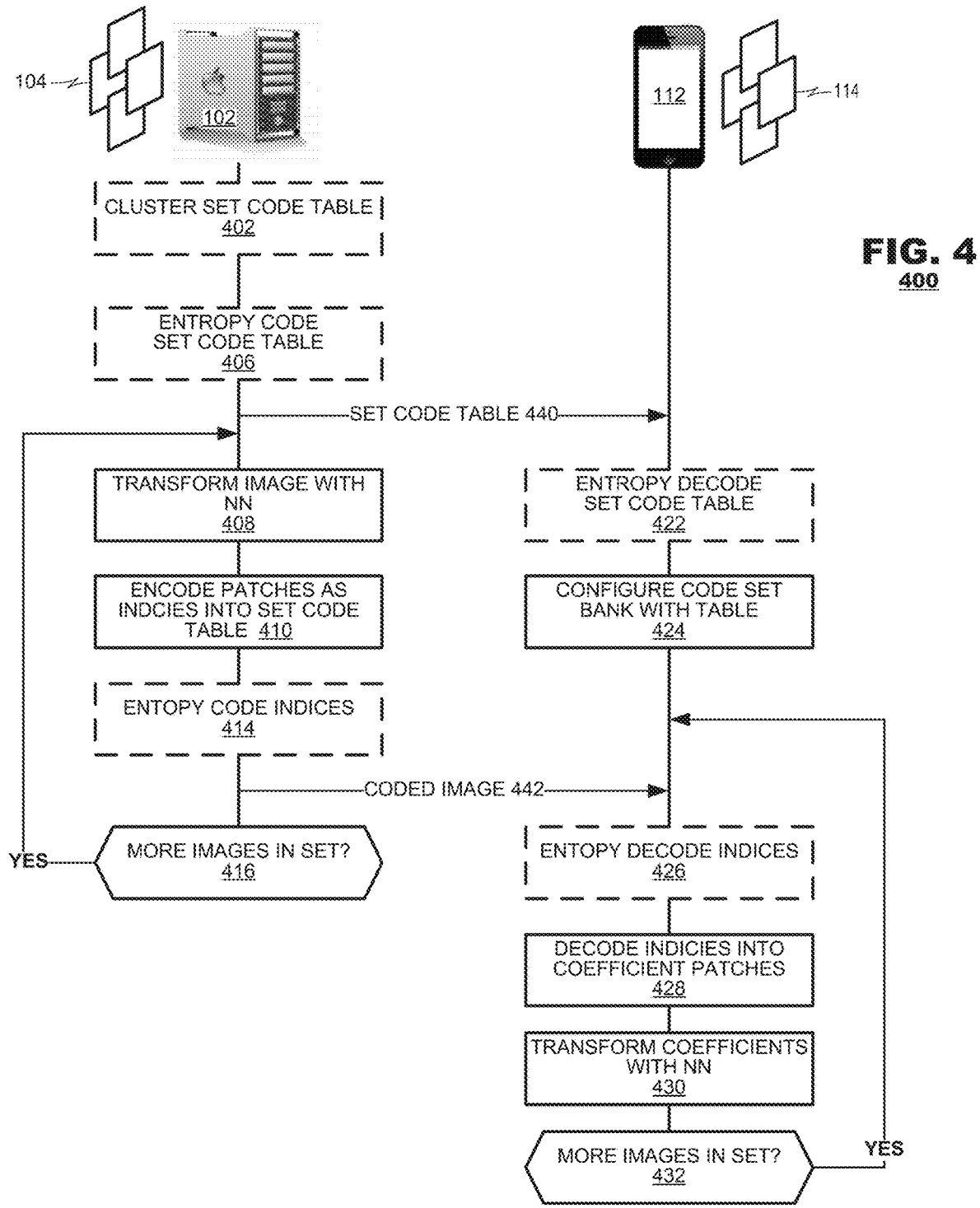
FIG. 4 depicts an example flow diagram for encoding and decoding image sets.

FIG. 4 depicts an example process flow diagram 400 for encoding and decoding image sets. Encoder 102 may encode an image set 104 of one or more images or videos and decoder 112 may produce a corresponding decoded set of images or videos 114, as in FIG. 1. A method for encoding an image set 104 at encoder 102 may include sending a set code table from encoder 102 to decoder 112 (message 440). Then for each image of the image set to be encoded, the image is transformed with an encoder neural network configured with the encoder weights to produce coefficients (box 408), coefficient patches are encoded as indices of an set code table in a code set bank (box 410), and a collection of indices for a plurality of patches are sent as an coded image to decoder 112 (message 442). When additional images in the set are to be encoded (box 416), the encoding process repeats box 408, box 410, and message 442 for each additional image.

A decoder method at decoder 112 may include receiving a set code table for the image set (message 440). A code set bank may be configured with the received set code table (box 424). For every coded image received (message 442), code set bank indices may be decoded into coefficient patches with the set code table (box 428), and coefficients may be transformed with a decoder transform neural network (box 430) to produce an output image. If there are additional images in set (box 432), message 442, box 428, and 430 may be repeated.

In an aspect, a set code table may be determined at encoder 102 by a clustering process for the entries in the table (optional box 402). A set code bank at the encoder 102 may be configured with the determined code set table, and the set code table determined in optional box 402 may be sent to decoder 112 in message 440. In some aspects, the determined set code table may be entropy coded (optional box 406) before sending it to decoder 112 in message 440.

In an aspect, a collection of indices from the code set bank may be entropy coded together as a compressed image (box 414). After storage or transmission to a receiver, the process may be reversed by entropy decoding the compressed image into a collection of indices (box 426). The entropy coding and decoding of boxes 414 and 426 may be based on a neural network or other entropy coding techniques. If entropy coding is based on a neural network, weights for the entropy coding neural network may be trained jointly along with the encoder and decoder weights.

Figure 5:
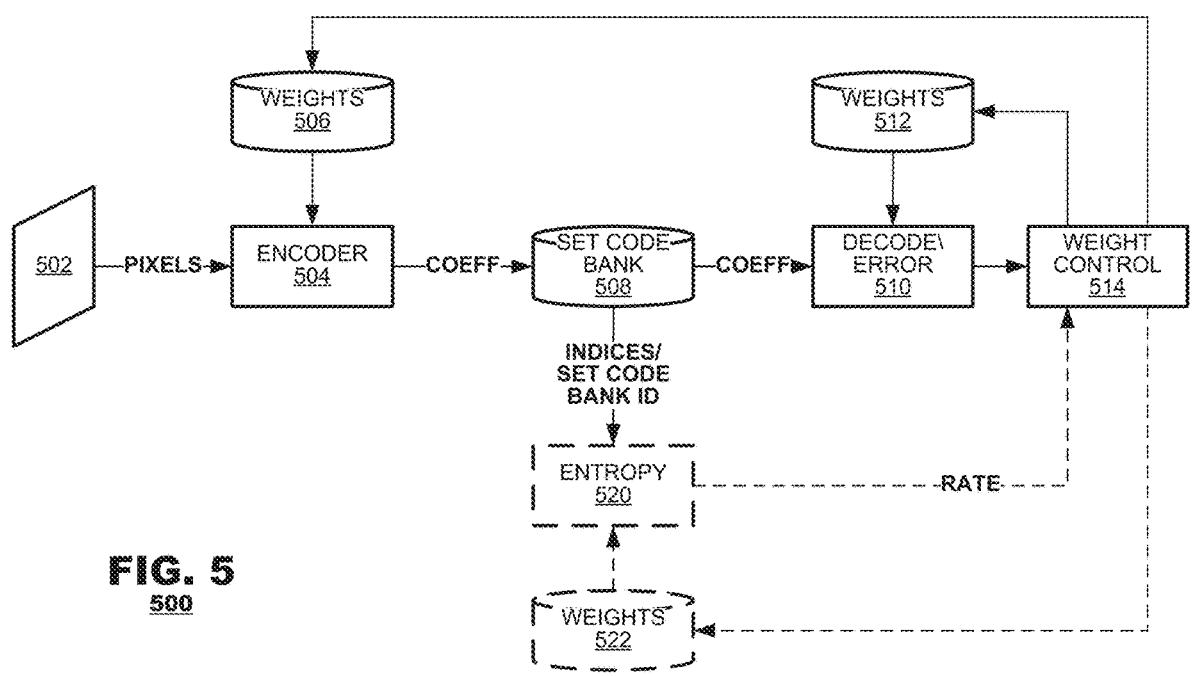
FIG. 5 depicts an example system for training an image set encoder.

FIG. 5 depicts an example system for training an image set encoder. Training system 500 includes an input image 502, transform encoder neural network 504 with encoder weights 506, code set bank 508, decoder neural network 510 with decoder weights 512 and a controller for weights 514. An image 502 comprising pixels may be transformed by an encoder neural network 504 configured with encoder weights 506 producing transform coefficients. Groups or patches of coefficients at a time may be approximated in the set code bank 508 by selecting an entry in an encoding table having individual coefficients that approximate individual input coefficients. Patches of approximating coefficients are output to a decoder neural network 510 configured with decoder weights 512. The decoder neural network 510 may transform patches of approximated coefficient into pixel data of a decoded image and may then compare to the input image 502 to the decoded image to determine an approximation error for the decoded image with the current iteration of weights 506 and 512. Weight control 514 may adjust weights 506 and 512 based on the approximation error of the decoded image. For example, weight control may adjust weights in order to minimize visual distortion of the decoded image as measured by the approximation error determined by decode transform neural network 510. This training process may repeat over for all images in a training data set, with adjustments made continuously or periodically to the weights by weight control 514.

In an aspect, weight control may be based on a compression rate (or total compressed size) of image 502 after entropy coding of the indices of the selected code set bank table entries. In this aspect, set code back 508 may provide table indices to optional entropy coder 520, where each index provided corresponds to the selected table entry containing the patch of approximation coefficients sent to decoder neural network 510. Optional entropy coder 520 may entropy code the stream of indices from set code bank for image 502 and determine a rate (such as bits per pixel) or total size (such as bytes) for the entropy coded indices of image 502. In this aspect, weight control 514 may adjust neural network weights with an algorithm attempting to jointly minimize approximation error and entropy coded rate. For example, weight control 514 may attempt to minimize a weighted sum of the approximation error and entropy coded rate at each iteration of weight control adjustments. In one example of this aspect, optional entropy coder 520 may be based on neural network configured with optional entropy coding weights 522, and the optional entropy coding weights may be jointly adjusted by weight control 514 along with adjustments to encoder and decoder weights 506 and 512.

We claim:

1. A method for image encoding, comprising:
    transforming a first image of a set of images to produce a spatial array of coefficients with an encoder neural network;
    encoding coefficients of the spatial array as a collection of integer patch indices including encoding a group of the coefficients as a first integer patch index into a set coding table associated with the set of images, each entry of the set coding table having a vector of coefficients; and
    storing the collection of integer patch indices including the first integer patch index as a first coded image.

2. The method of claim 1, wherein the entries of the set coding table are based on a clustering process with the set of images as an input to the clustering process.

3. The method of claim 1, further comprising:
    transforming a second image of the set of images into second coefficients with the encoder neural network;
    encoding second coefficients into a collection of second integer patch indices including encoding a group of the second coefficients as a second integer patch index into the set coding table;
    storing the collection of second integer patch indices including the second integer patch index as a second coded image;
    storing the first coded image, the second coded image, and the set coding table as a coded set of images.

4. The method of claim 1, wherein the encoder neural network is configured with a set of encoder weights and a decoder neural network is configured with a set of decoder weights, and further comprising:
    training the set of encoder weights together with the set of decoder weights to minimize a joint rate-distortion metric using a plurality of sets of images as a training dataset; and
    storing the decoder weights as a global code for multiple image sets.

5. The method of claim 4, further comprising:
    training entropy coding weights for an entropy coding neural network while training the set of encoder weights and the set of decoder weights; and
    entropy coding the first coded image and the set coding table with the entropy coding neural network.

6. The method of claim 1, wherein:
    the encoder neural network is a convolutional neural network with a plurality of layers;
    each layer comprises nodes, each node having an output defined by a set of weights; and
    one set of weights is shared amongst all nodes within a layer.

7. A method for image decoding, comprising:
    configuring a set code bank with a set coding table, wherein the set coding table is associated with a set of images;
    decoding, from encoded image data for the set of images, an index corresponding to a first patch of transform coefficients of an image in the set of images into coefficients for the patch with the set code bank;
    transforming coefficients for a plurality of patches including the first patch with a decoder neural network into decoded image pixels.

8. The method of claim 7, further comprising:
entropy decoding coded data to determine the index;
entropy decoding coded data to determine the set coding table.

9. The method of claim 7, wherein:
the neural network is a convolutional neural network with a plurality of layers;
each layer comprises nodes, each node having an output defined by a set of weights; and
one set of weights is shared amongst all nodes within a layer.

10. A non-transitory computer readable medium storing instructions that, when executed by a processor, cause:
transforming a first image of a set of images to produce a spatial array of coefficients with an encoder neural network;
encoding a group of the coefficients as a first integer patch index into a set coding table associated with the set of images, each entry of the coding table having a vector of coefficients; and
storing a collection of integer patch indices including the first integer patch index as a first coded image.

11. The computer readable medium of claim 10, wherein the entries of the set coding table are based on a clustering process with the set of images as an input to the clustering process.

12. The computer readable medium of claim 10, wherein the instructions further cause:
transforming a second image of the set of images into second coefficients with the encoder neural network;
encoding a group of the second coefficients as a second integer patch index into the set coding table;
storing a collection of second integer patch indices including the second integer patch index as a second coded image;
storing the first coded image, the second coded image, and the set coding table as a coded set of images.

13. The computer readable medium of claim 10, wherein the encoder neural network is configured with a set of encoder weights and a decoder neural network is configured with a set of decoder weights, and wherein the instructions further cause:
training the set of encoder weights together with the set of decoder weights to minimize a joint rate-distortion metric using a plurality of sets of images as a training dataset; and
storing the decoder weights as a global code for multiple image sets.

14. The computer readable medium of claim 13, wherein the instructions further cause:
training entropy coding weights for an entropy coding neural network while training the set of encoder weights and the set of decoder weights; and
entropy coding the first coded image and the set coding table with the entropy coding neural network.

15. The computer readable medium of claim 10, wherein:
the encoder neural network is a convolutional neural network with a plurality of layers;
each layer comprises nodes, each node having an output defined by a set of weights; and
one set of weights is shared amongst all nodes within a layer.

16. A system for image encoding, comprising:
an encoding transform comprising an encoder neural network having an input for pixel data from a set of images and producing coefficients as an output;
a code set bank for mapping a group of the coefficients into a first patch integer index indicating an entry in a set coding table, wherein the set coding table is associated with the set of images and each entry in the coding table indicates approximations for each coefficient in the group of coefficients; and
a storage unit for storing a collection of integer patch indices produced by the code set bank including the first integer patch index as a first coded image.

17. The system of claim 16, wherein the entries of the set coding table are based on a clustering process with the set of images as an input to the clustering process.

18. The system of claim 16, wherein:
the encoder neural network is configured with a set of encoder weights and a decoder neural network is configured with a set of decoder weights; and
the set of encoder weights are trained together with the set of decoder weights to minimize a joint rate-distortion metric using a plurality of sets of images as a training dataset; and
the storage unit stores the decoder weights as a global code for multiple image sets.

19. The system of claim 18, further comprising:
an entropy coder for entropy coding the first coded image and the set coding table with an entropy coding neural network, wherein
a set of entropy coding weights for the entropy coding neural network are jointly trained with the set of encoder weights and the set of decoder weights.

20. The system of claim 16, wherein:
the encoder neural network is a convolutional neural network with a plurality of layers;
each layer comprises nodes, each node having an output defined by a set of weights; and
one set of weights is shared amongst all nodes within a layer.

* * * * *